(12) United States Patent
Shifflet

(10) Patent No.: US 6,458,302 B1
(45) Date of Patent: Oct. 1, 2002

(54) SYSTEM AND METHOD FOR FORMING PLASTIC ARTICLES

(75) Inventor: Eric H. Shifflet, Waynesville, IL (US)

(73) Assignee: Tekni-Plex, Inc., Somerville, NJ (US)

( * ) Notice: Subject to any disclaimer, the term of this patent is extended or adjusted under 35 U.S.C. 154(b) by 0 days.

(21) Appl. No.: 09/535,674

(22) Filed: Mar. 23, 2000

(51) Int. Cl.$^7$ .............................................. B29C 47/00
(52) U.S. Cl. ...................... 264/148; 425/311; 425/315
(58) Field of Search ................................ 264/148, 145, 264/163; 425/311, 308, 315; 82/53.1; 83/37, 355, 471, 701

(56) References Cited

U.S. PATENT DOCUMENTS

| | | | |
|---|---|---|---|
| 1,613,567 A | | 1/1927 | Ogden |
| 2,082,833 A | | 6/1937 | Haupt |
| 3,646,894 A | | 3/1972 | Hasten et al. |
| 3,739,052 A | | 6/1973 | Ayres et al. |
| 3,771,393 A | * | 11/1973 | Gatto et al. ................ 408/124 |
| 3,800,597 A | * | 4/1974 | Paul et al. .................. 73/54.32 |
| 3,856,449 A | | 12/1974 | Fischer |
| 4,028,458 A | | 6/1977 | Wallace |
| 4,332,538 A | | 6/1982 | Campbell |
| 4,487,240 A | * | 12/1984 | Bergler ........................ 144/230 |
| 4,585,600 A | | 4/1986 | Rollyson et al. |
| 4,740,149 A | | 4/1988 | Kristensen |
| 5,102,599 A | | 4/1992 | Shults |
| 5,937,521 A | | 8/1999 | March et al. |
| 5,974,932 A | * | 11/1999 | Suzuki et al. .................. 83/318 |

OTHER PUBLICATIONS

Printout from: http:\\www.Bernalintl.com, of Bernal International, Inc. showing crush cut rotary dies.

Hill Engineering, Inc. ,Rotary Punching, High Speed Punching Without High Speed Presses.

* cited by examiner

Primary Examiner—Mark Eashoo
(74) Attorney, Agent, or Firm—Pitney, Hardin, Kipp & Szuch LLP

(57) ABSTRACT

A method and apparatus for forming plastic articles is provided. A rotating cutter, having a cutting blade mounted thereto, is disposed adjacent to a continuous extrudate. Upon rotation of the cutter, non-linear cutting edges formed on the cutting blade simultaneously cause a predetermined length of the extrudate to be severed and formed. The method and apparatus are well-suited for forming plastic articles having an elongated shape with rounded ends.

9 Claims, 5 Drawing Sheets

SYSTEM AND METHOD FOR FORMING PLASTIC ARTICLES

BACKGROUND OF THE INVENTION

1. Field of the Invention

This invention relates to methods for forming an article from a continuous extrusion process and, more particularly, to methods for forming plastic articles from a continuous extrusion process.

2. Description of Prior Art

In the prior art, techniques are known for forming plastic articles from a continuous extrudate. Rotary punches are commonly used to form such articles, wherein the extrudate is fed between a synchronized, rotating pair of mating punch and die. The punch and die simultaneously sever the extrudate and form it to a desired shape. Rotary punches, however, suffer from several drawbacks. First, the punch and die are relatively expensive. Second, the punch and die are designed for a specific application, and generally do not include any adjustability (i.e., punch and die generally cannot be adjusted to form different size articles). Third, tooling and maintenance costs are relatively high, with replacement parts, including tooling, often being only obtainable from the original manufacturer.

Separately, techniques have been developed in the prior art for using a rotary straight-edged knife for severing an extrudate into desired lengths. The following patents disclose such a technique: U.S. Pat. No. 2,082,833 to Haupt; U.S. Pat. No. 4,585,600 to Rollyson et al.; and, U.S. Pat. No. 4,740,149 to Kristensen. The severed lengths, however, have straight, planar ends defined by the straight-edged knife. Any additional shaping and forming required for the severed lengths must be done in further steps.

It is an object of the subject invention to provide a method and apparatus for forming plastic articles having non-planar ends.

It is also an object of the subject invention to provide a method and apparatus for simultaneously severing and forming predetermined lengths of an extrudate.

SUMMARY OF THE INVENTION

The aforementioned objects are met by a method and apparatus for simultaneously severing and forming predetermined lengths of an extrudate to form plastic articles. The method and apparatus rely on a cutting blade having at least one non-linear cutting edge. The cutting edge is defined on the cutting blade which is mounted on a rotating cutter. The rotating cutter is disposed adjacent to a continuous extrudate, such that the path of travel of the cutting blade intersects the path of travel of the extrudate. In this manner, upon rotation of the cutter, the cutting edge causes a length of the extrudate to be severed from the remainder of the extrudate. Simultaneously, the non-linear cutting edge imparts a non-planar shape to either the severed end of the predetermined length or the remainder of the extrudate. It is preferred that the cutter have at least two non-linear cutting edges so that the trailing edge of a severed end of a predetermined length of extrudate can be simultaneously formed with a desired shape as well as the leading end of the remainder extrudate. Thus, both ends of a predetermined length can be formed with non-planar ends. After being severed and formed from the extrudate, the predetermined length of extrudate is allowed to cool to form the article.

The method of the subject invention is particularly well-suited for forming elongated articles having rounded ends, such as popsicle sticks, and spreading sticks for applying spreads, cheeses, and other comestibles. Furthermore, the rotation of the cutter and/or the feed rate of the extrudate are preferably adjustable to vary the predetermined length of extrudate that is to be cut, and the cutter can be readily replaced to enable the formation of different shapes on the ends of the articles. With these two features, the subject invention provides versatility in allowing for various sized products to be formed.

The invention will be better understood through a study of the following detailed description and accompanying drawings.

DETAILED DESCRIPTION OF THE INVENTION

Figure 1:
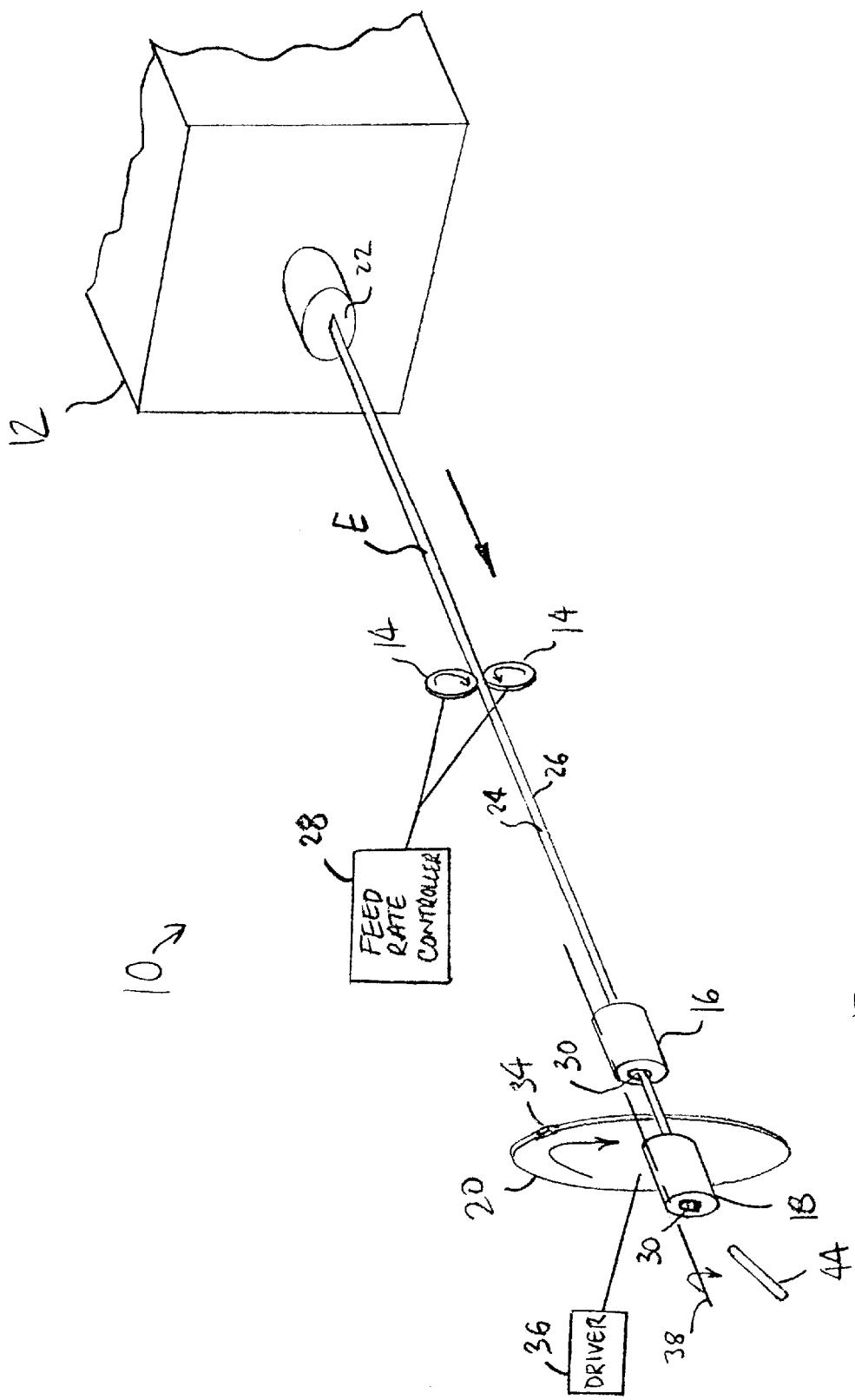
FIG. 1 is a schematic of an apparatus formed in accordance with the subject invention.

Referring generally to the FIGS., a method and apparatus are described for forming plastic articles. FIG. 1 schematically depicts an apparatus 10 which generally includes an extruder 12, feed rollers 14, two bushings 16, 18, and a rotating cutter 20.

Figure 3:
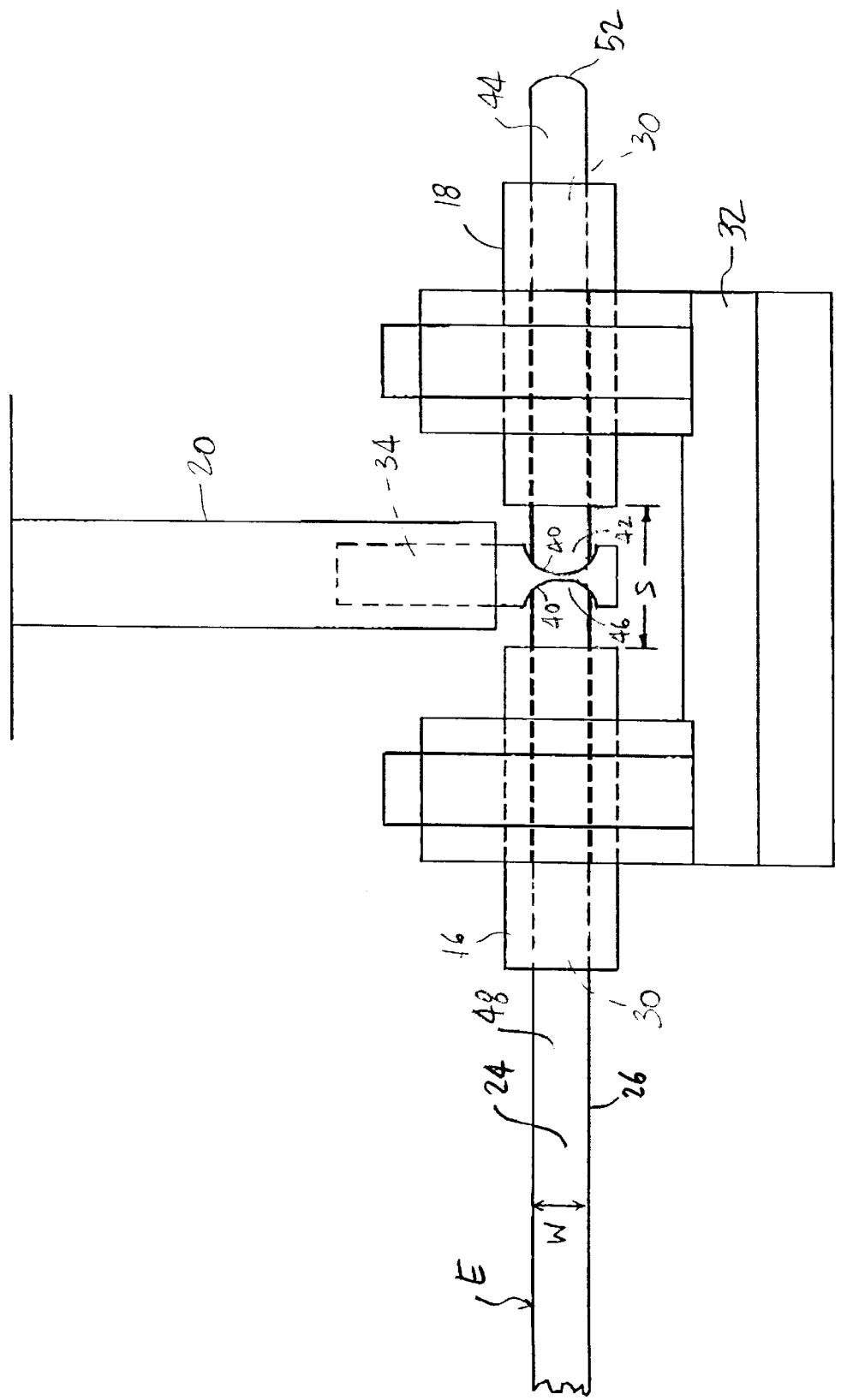
FIG. 3 is a top partial view of the cutting blade severing and forming a predetermined length of an extrudate.
Figure 4:
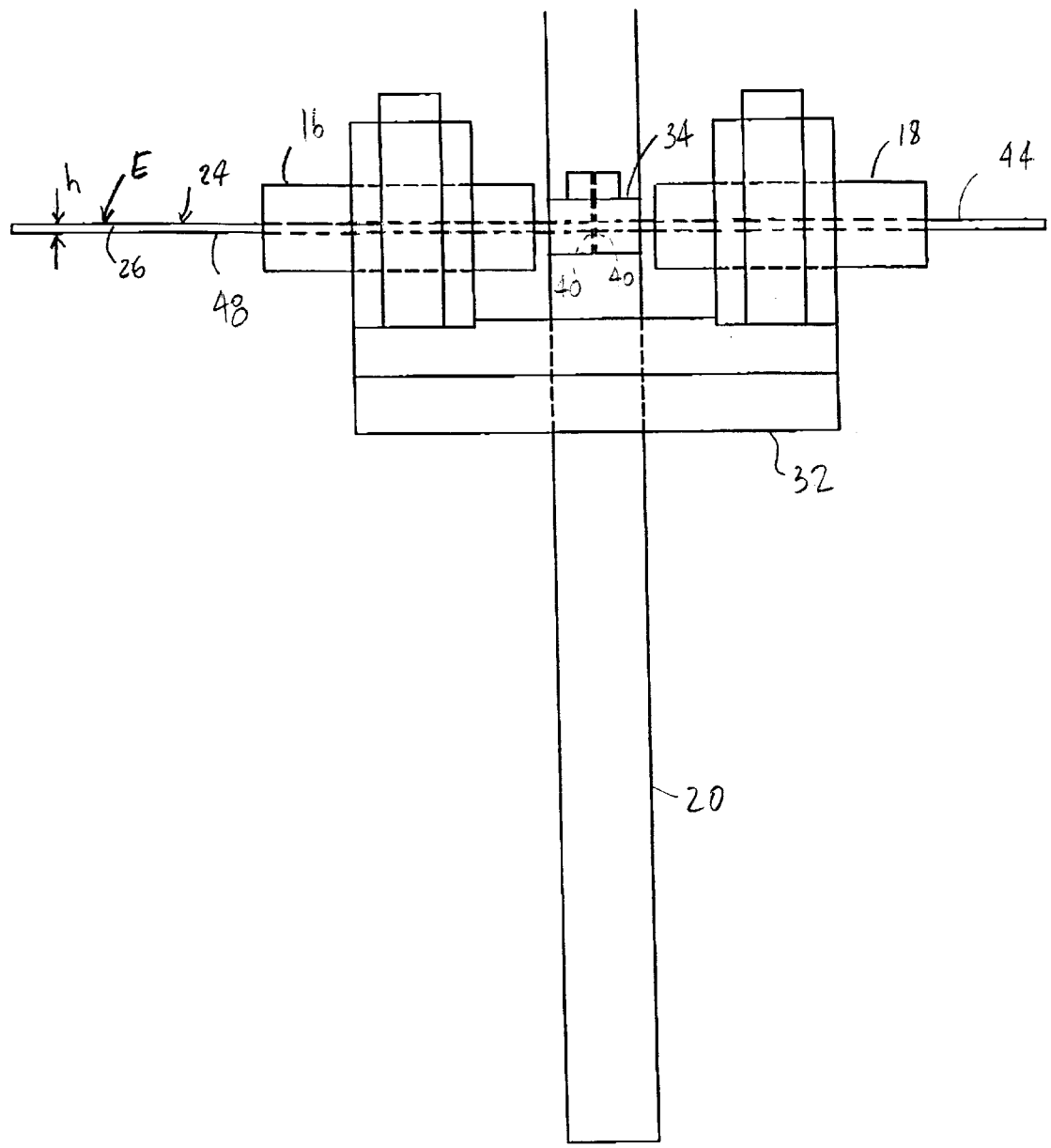
FIG. 4 is a front elevational view of the process described in FIG. 3.

The extruder 12 is of any type known to those skilled in the art for forming an elongated extrudate E. The subject invention is concerned with forming plastic articles, and thus the extrudate E is to be of a plastic material. Other materials may be used. For example, the extruder 12 can be formed with a slot die 22 through which molten plastic material is forced to form the extrudate E. Preferably, the extrudate E is rectangular in cross-section, but can be formed with other cross-sectional shapes. Additionally, it is preferred that faces 24 be formed with a greater width w (FIG. 3) than height h of sides 26 (FIG. 4).

The feed rollers 14 are positioned to impinge upon the extrudate E to provide a driving force thereto away from the extruder E and towards the rotating cutter 20. Any design of the feed rollers 14 may be used, as well as different quantities thereof. The feed rollers 14 are driven by a feed rate controller 28, which preferably has a variable rate of control. As such, through adjustment of the feed rate controller 28, the rates of rotation of the feed rollers 14 may be adjusted to vary the driving speed of the extrudate E.

The bushings 16, 18, are both generally tubular in shape, having passages 30 dimensioned to allow the extrudate E to pass therethrough. The bushings 16 and 18 are axially aligned with the openings 30 being aligned so that the extrudate E can be fed straight through the bushing 16, and into the bushing 18. As shown in FIG. 3, the bushings 16, 18 are both rigidly supported by a brace 32, with an axial space S being defined between the bushings 16, 18. The brace 32 may be a unitary construction, but other supports can be used. The axial space S is set such that a cutting blade 34 may pass between the bushings 16, 18, as described below.

In addition, the axial space S is kept to a minimum so as to maximize the backing force provided by the bushings 16, 18 to the extrudate E during a cutting operation. The bushings 16, 18, in effect, serve as anvils which counteract the cutting force supplied by the cutting blade 34, to ensure the extrudate E is severed and formed cleanly.

Figure 2:
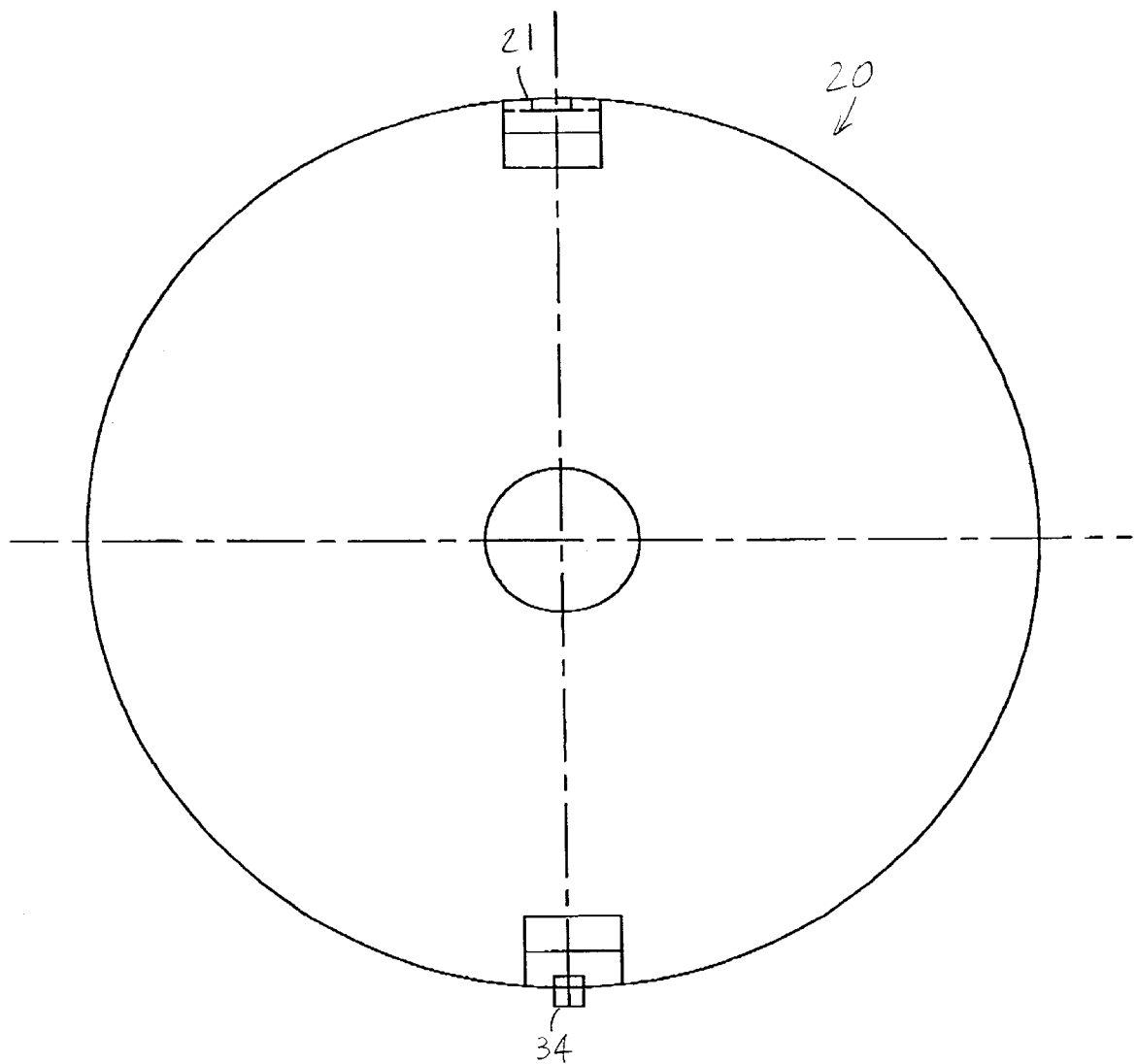
FIG. 2 is a side elevational view of a cutter with a cutting blade mounted thereto.

As best shown in FIG. 2, the rotating cutter 20 is generally circular shaped and has the cutting blade 34 mounted on the periphery thereof. It is preferred that the cutting blade 34 be removable from the rotating cutter 20, but it may also be rigidly fixed thereto. Although not shown, a plurality of evenly-spaced cutting blades may be mounted to the periphery of the rotating cutter 20. Using techniques known to those skilled in the art, the rotating cutter 20 should be provided with a counterweight 21 to ensure proper balance during rotation of the rotating cutter 20, especially when one of the cutting blades 34 is used. The rotating cutter 20 is disposed adjacent to the extrudate E, so that upon rotation thereof, the path of travel of the cutting blade 34 will intersect the path of travel of the extrudate E. In addition, referring to FIG. 1, the rotating cutter 20 is driven by a driver 36, which preferably can adjust the driving rate of the rotating cutter 20. Finally, the rotating cutter 20 is disposed to rotate about an axis 38, which preferably is generally parallel to the path of travel of the extrudate E.

Figure 5:
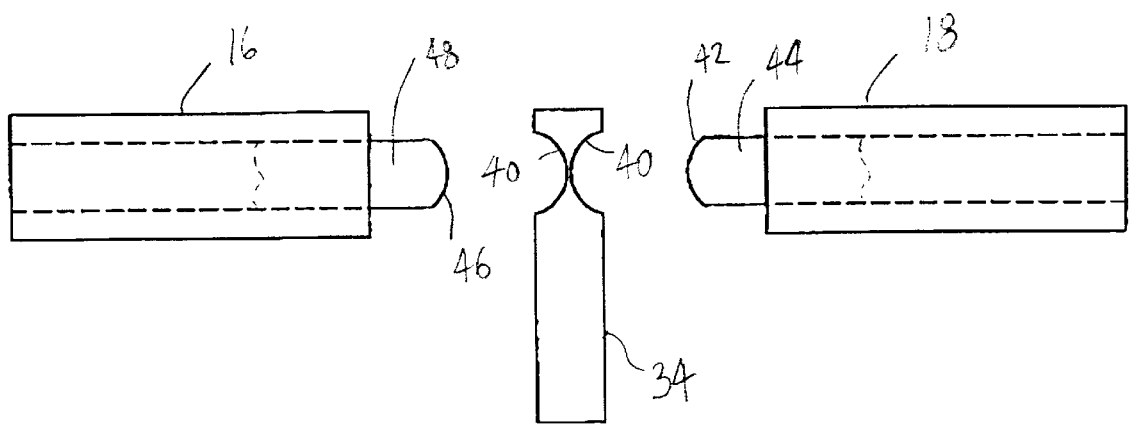
FIG. 5 is a partial exploded view showing a severed length of extrudate having a formed trailing end and the leading end of the remainder extrudate being formed; and, FIG. 6 is a plan view of a finished plastic article.
Figure 6:
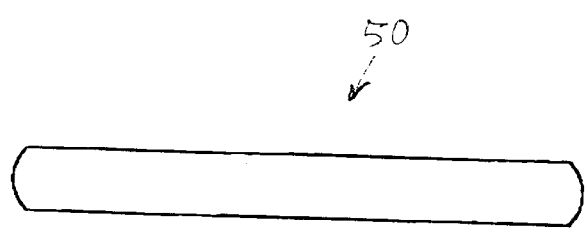

The cutting blade 34, as best shown in FIG. 5, preferably has two non-linear cutting edges 40. The cutting edges 40 are formed in accordance with techniques known by those skilled in the art for forming tool cutting edges. In a preferred embodiment, the cutting blade 34 is a unitary piece; however, the cutting blade 34 can be a modular component, with the cutting edges 40 being formed on one or more pieces.

The non-linear cutting edges 40 are preferably concave in shape but other nonlinear shapes are possible. The shapes of the non-linear cutting edges 40 are imparted to the extrudate in forming a plastic article while severing a predetermined length. The two non-linear cutting edges 40 need not have the same shape. Alternatively, only one of the non-linear cutting edges 40 can be provided. Also, as shown in FIG. 3, it is preferred that the non-linear cutting edges 40 cover a greater length then the width w of the extrudate E to ensure the entire width w is severed and formed clearly.

The rotating cutter 20 is located in the apparatus 10 so that the cutting blade 34 has a path of travel that transversely intersects the path of travel of the extrudate E. In this manner, the non-linear cutting edges of 40 may simultaneously sever a predetermined length 44 of the extrudate E from a remainder 48 of the extrudate E. It is preferred that one of the faces 24 of the extrudate E be entirely stricken against simultaneously by the non-linear cutting edges 40. It is further preferred that the entire lengths of the non-linear cutting edges 40 strike simultaneously against the extrudate E. To achieve this result, the axis 38, defining rotation of the rotating cutter 20, is preferably generally coplanar with the extrudate E.

In operation, the extrudate E is continuously extruded by the extruder 12 and fed by the feed rollers 14 into the bushing 16, and then into the bushing 18. The feed rate controller 28 and the driver 36 are synchronized to define the length of the predetermined length 44 to be severed and formed. The feed rate controller 28 and/or the driver 36 can be varied to adjust the length of the predetermined length 44. Specifically, with the rotation speed of the rotating cutter 20 being held constant, an increase in the feed rate applied by the feed rate controller 28 results in an elongation of the predetermined length 44; conversely, a decrease in the feed rate applied by the feed rate controller 28 results in a foreshortening of the predetermined length 44. Also, with the feed rate being held constant, an increase in the rotating speed of the rotating cutter 20 applied by the driver 36 results in a foreshortening of the predetermined length 44, whereas, a decrease results in an elongation of the predetermined length 44.

Upon rotation of the rotating cutter 20, the cutting blade 34 traverses its path of travel. Preferably, the paths of travel of the cutting blade 34 and the extrudate E are generally perpendicular. The cutting blade 34 engages the extrudate E, with the bushings 16, 18, counteracting the downward force of the cutting blade 34. The non-linear cutting edges 40 cause the predetermined length 44 to be severed from the remainder 48. Simultaneously, the non-linear cutting edges 40 impart their respective shapes to form a trailing end 42 of the predetermined length 44 and a leading end 46 of the remainder 48. With the leading end 46 of the remainder 48 being formed, the extrudate E is further fed and the cutting blade 34 causes another predetermined length 44 to be severed. The prior leading end 46 of the remainder 48 is now a leading end 52 of the predetermined length 44. Accordingly, the leading end 52 and the trailing end 42 of the predetermined length 44 have been sequentially severed and formed.

The predetermined length 44 is at least partially disposed in the bushing 18 after being severed and formed, wherein it may fall out, or be ejected upon the further feeding of the extrudate E. The predetermined length 44 is allowed to cool to form a finished plastic article 50. The plastic article 50 may be a plastic popsicle stick, or other plastic stick having rounded ends, such as a food spreading implement.

If one of the non-linear cutting edges 40 is provided, then one of the trailing end 42 and the leading end 46 will be formed with a non-linear shape.

As is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed.

What is claimed is:

1. A method for forming plastic articles, said method comprising the steps of:

extruding a plastic material to form a continuous extrudate;

providing a rotating cutter having a cutting blade with at least one non-linear cutting edge, said cutting blade having a path of travel which transversely intersects a path of travel of said extrudate; and, rotating said rotating cutter with said cutting blade passing through the path of travel of said extrudate, said cutting blade simultaneously severing a predetermined length of said extrudate to form an article and forming at least one of a trailing end of the severed length of said extrudate and a leading end of the remainder of said extrudate, wherein the respective formed shape of at least one of said trailing end of said severed length and said leading end of the remainder being imparted by said non-linear cutting edge.

2. A method as in claim 1 further comprising the steps of providing a first tubular bushing, and passing said extrudate through said first bushing, wherein the path of travel of said cutting blade is in proximity to said first bushing.

3. A method as in claim 2 further comprising the steps of providing a second tubular bushing and passing said extrudate through said second bushing, wherein the path of travel of said cutting blade partially passes between said first and second bushings.

4. A method as in claim 1, wherein said rotating cutter rotates about an axis that is generally parallel to said path of travel of said extrudate.

5. A method as in claim 1, wherein the rate of rotation of said rotating cutter is variable to selectively adjust the predetermined length.

6. A method as in claim 1, wherein the feed rate of said extrudate is variable to selectively adjust the predetermined length.

7. A method as in claim 1, wherein said path of travel of said cutting blade is substantially perpendicular to said path of travel of said extrudate.

8. A method as in claim 1, wherein said cutting blade is removably mounted to said rotating cutter.

9. A method as in claim 1, wherein said cutting blade having two non-linear cutting edges, said cutting blade simultaneously forming both said trailing end of the severed length of said extrudate and said leading end of the remainder of said extrudate, and wherein the respective formed shapes of said trailing end of said severed length and said leading end of the remainder being respectively imparted by said non-linear cutting edges.

* * * * *